(12) United States Patent
Park et al.

(10) Patent No.: US 9,752,365 B2
(45) Date of Patent: Sep. 5, 2017

(54) DUAL-OPENING PANORAMIC SUNROOF AND METHOD OF OPERATING THE SAME

(71) Applicants: Hyundai Motor Company, Seoul (KR); Webasto Donghee Holdings Co., Ltd., Ulsan (KR)

(72) Inventors: Jae-Han Park, Suwon-si (KR); Jin-Ho Kim, Incheon (KR); Su-Yun Choi, Ulsan (KR); Ji-hoon Ha, Ulsan (KR)

(73) Assignees: Hyundai Motor Company, Seoul (KR); Webasto Donghee Holdings Co., Ltd., Ulsan (KR)

( * ) Notice: Subject to any disclaimer, the term of this patent is extended or adjusted under 35 U.S.C. 154(b) by 0 days.

(21) Appl. No.: 14/850,217

(22) Filed: Sep. 10, 2015

(65) Prior Publication Data

US 2016/0312506 A1    Oct. 27, 2016

(30) Foreign Application Priority Data

Apr. 27, 2015   (KR) .................... 10-2015-0058881

(51) Int. Cl.
  *B60R 22/00*    (2006.01)
  *E05F 15/00*    (2015.01)
  *G05D 1/00*    (2006.01)
  *G05D 3/00*    (2006.01)
  *G06F 7/00*    (2006.01)
  (Continued)

(52) U.S. Cl.
  CPC .......... *E05D 15/0608* (2013.01); *B60J 7/043* (2013.01); *B60J 7/047* (2013.01); *B60J 7/0573* (2013.01); *E05F 15/00* (2013.01); *E05D 15/10* (2013.01); *E05F 15/655* (2015.01); *E05Y 2900/542* (2013.01)

(58) Field of Classification Search
  CPC .......... B60J 7/043; B60J 7/047; B60J 7/0573; E05D 15/10; E05F 15/00; E06B 3/509
  USPC .......................................................... 701/49
  See application file for complete search history.

(56) References Cited

U.S. PATENT DOCUMENTS 4,786,102 A    11/1988  Sakamoto et al.
6,129,413 A  * 10/2000  Klein .................. B60J 7/047
                                                       296/214

(Continued)

FOREIGN PATENT DOCUMENTS

JP    2002-356113 A    12/2002
JP    2011-11735 A    1/2011
(Continued)

*Primary Examiner* — Maceeh Anwari
(74) *Attorney, Agent, or Firm* — Morgan Lewis & Bockius LLP

(57) ABSTRACT

A dual-opening panoramic sunroof may include front glass which slides forward and rearward by being connected with a front sled that is slidable forward and rearward along a mechanism rail, a rear glass which slides forward and rearward by being connected with a rear sled, a front timing plate which has a rear end rotatably coupled to the rear sled, and a front end formed with a front groove to accommodate a portion of the front sled, and selectively connects the front sled and the rear sled, a rear tilt lever which is disposed rearward of the mechanism rail, and a rear timing plate which has a rear end rotatably coupled to the rear tilt sled, and a front end formed with a rear groove formed to selectively accommodate a portion of the rear sled, and connects the rear sled and the rear tilt sled.

7 Claims, 13 Drawing Sheets

(51) Int. Cl.
*G06F 17/00* (2006.01)
*E05D 15/06* (2006.01)
*B60J 7/047* (2006.01)
*B60J 7/043* (2006.01)
*B60J 7/057* (2006.01)
*E05D 15/10* (2006.01)
*E05F 15/655* (2015.01)

(56) References Cited

U.S. PATENT DOCUMENTS

| | | |
|---|---|---|
| 7,178,862 B2 | 2/2007 | Oechel |
| 7,229,126 B2 | 6/2007 | Seifert |
| 2014/0035329 A1 | 2/2014 | Ohdoi et al. |

FOREIGN PATENT DOCUMENTS

| | | |
|---|---|---|
| JP | 5638368 B2 * | 12/2014 |
| JP | 5638368 B2 | 12/2014 |
| KR | 10-0996248 B1 | 11/2010 |

* cited by examiner

DUAL-OPENING PANORAMIC SUNROOF AND METHOD OF OPERATING THE SAME

CROSS-REFERENCE TO RELATED APPLICATION

The present application claims priority to Korean Patent Application No. 10-2015-0058881 filed Apr. 27, 2015, the entire contents of which is incorporated herein for all purposes by this reference.

BACKGROUND OF THE INVENTION

Field of the Invention

The present invention relates to a panoramic sunroof installed on a roof panel of a vehicle and a method of operating the same, and more particularly, to a dual-opening panoramic sunroof in which a front glass and a rear glass are all mounted to be slidable after being tilted up toward the outside of the roof panel, and the front glass and the rear glass are operated by a single drive motor by using a front timing plate and a rear timing plate, and a method of operating the same.

Description of Related Art

An opening may be formed in a roof panel of a vehicle in order to discharge air in the vehicle to the outside or allow outside air to flow into the vehicle, and the opening is typically opened and closed by a sunroof glass.

Particularly, recently, a panoramic sunroof, in which most of the roof panel of the vehicle is manufactured using glass, and a part of the roof panel is selectively opened and closed, is being widely used for the purpose of allowing open feeling and enhancing aesthetic design.

The driver may enjoy driving the vehicle by opening the sunroof glass of the panoramic sunroof when the vehicle is traveling, and the panoramic sunroof allows the driver to have a larger amount of sunlight than a general sunroof when the vehicle is stopped.

In general, the panoramic sunroof includes a front glass which is slidably mounted forward of the roof panel, and a rear glass which is fixedly mounted rearward of the roof panel, and the front glass slides forward and rearward by a drive motor.

However, in the case of the panoramic sunroof in the related art, only the front glass is opened, and the rear glass is fixed, such that there is no particular difference between the panoramic sunroof and the general sunroof, and there is a problem in that occupants seated in rear seats cannot feel open feeling.

A dual-opening panoramic sunroof in which both of the front glass and the rear glass may slide has been developed to solve the problem, but the dual-opening panoramic sunroof also has a drawback in that a space of a head room in the vehicle is decreased.

That is, in the case of the dual-opening panoramic sunroof in the related art, the front glass is configured to slide toward the outside of the roof panel, and the rear glass is configured to slide toward the inside of the roof panel, and as a result, there is a problem in that the space of the head room is relatively decreased.

In the case of the dual-opening panoramic sunroof in the related art, the front glass and the rear glass are operated by separate mechanisms, rails, and drive motors, respectively, and as a result, there are problems in that production costs and weight of the vehicle are increased, and the space of the head room in the vehicle is decreased because a separate space is required.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a dual-opening panoramic sunroof in which a front glass and a rear glass are all mounted to be slidable after being tilted up toward the outside of a roof panel, thereby relatively increasing a space of a head room in a vehicle, and a method of operating the same.

The present invention has also been made in an effort to provide a dual-opening panoramic sunroof in which a front glass and a rear glass are operated by a single drive motor by using a front timing plate and a rear timing plate, thereby reducing production costs and weight of a vehicle, and a method of operating the same.

According to various aspects of the present invention, a dual-opening panoramic sunroof may include a front glass which slides forward and rearward by being connected with a front sled that is slidable forward and rearward along a mechanism rail disposed at either side of an opening formed in a roof panel of a vehicle, a rear glass which slides forward and rearward by being connected with a rear sled that is slidable forward and rearward along the mechanism rail, a front timing plate which has a rear end rotatably coupled to the rear sled, and a front end formed with a front groove to accommodate a portion of the front sled, and selectively connects the front sled and the rear sled, a rear tilt lever which is disposed rearward of the mechanism rail, is rotatable by having a portion that is accommodated in a rear tilt sled that is slidable forward and rearward, and tilts up a rear portion of the rear glass, and a rear timing plate which has a rear end rotatably coupled to the rear tilt sled, and a front end formed with a rear groove formed to selectively accommodate a portion of the rear sled, and connects the rear sled and the rear tilt sled, in which both of the front glass and the rear glass are configured to slide after being tilted up toward an outside of the roof panel.

A front protrusion may protrude from one side of the front sled to be accommodated in the front groove, a front surface of the front groove may be formed as a first front inclined surface having an obtuse angle, a rear surface of the front groove may be formed as a second front inclined surface having an acute angle, and front and rear surfaces of the front protrusion may be formed to have shapes corresponding to shapes of the first front inclined surface and the second front inclined surface of the front groove.

A rail trimmed portion may be penetratively formed in a lower portion of the mechanism rail to restrict a lower end of the front groove of the front timing plate when the rear glass is closed.

A first rear protrusion may protrude from one side of the rear sled so as to be accommodated in the rear groove, a second rear protrusion may be formed to be spaced apart from the first rear protrusion so as to support the rear timing plate, a front surface of the rear groove may be formed as a first rear inclined surface having an acute angle, a rear surface of the rear groove may be formed as a second rear inclined surface having an obtuse angle, and front and rear surfaces of the first rear protrusion may be formed to have shapes corresponding to shapes of the first rear inclined surface and the second rear inclined surface of the rear groove.

A distance at which the first rear protrusion and the second rear protrusion are spaced apart from each other may be identical to a width of the rear timing plate such that the rear timing plate is prevented from being moved vertically when the rear sled is moved.

A first rear tilt slit and a second rear tilt slit may be curvedly and penetratively formed in the rear tilt sled, a first rear tilt protruding portion and a second rear tilt protruding portion, which are slidably accommodated in the first rear tilt slit and the second rear tilt slit, respectively, may be formed on the rear tilt lever, and when the rear tilt sled is moved rearward, the first rear tilt protruding portion and the second rear tilt protruding portion may be configured to slide along the first rear tilt slit and the second rear tilt slit, respectively, such that the rear tilt lever is rotated.

The dual-opening panoramic sunroof may further include a front lever which is rotatably connected between a front carriage plate coupled to a lower portion of the front glass and the front sled, and tilts up a front portion of the front glass, and a rear lever which may be rotatably connected between a rear rail coupled to a lower portion of the rear glass and the rear sled, and tilts up a front portion of the rear glass.

According to various aspects of the present invention, a method of operating a dual-opening panoramic sunroof may include opening a blind disposed below a front glass and a rear glass, which are slidably installed on a roof panel of a vehicle, when a first stage open signal is determined by an electronic control unit (ECU) of the vehicle, opening the front glass by moving a front sled rearward along a mechanism rail when the first stage open signal is determined again by the ECU in a state in which the blind is opened, and opening the rear glass by moving a rear sled rearward by the front sled when the first stage open signal is determined again by the ECU in a state in which the blind and the front glass are opened, in which all of the blind, the front glass, and the rear glass are opened when a second stage open signal is determined by the ECU prior to the opening of the blind, the front glass and the rear glass are opened when the second stage open signal is determined by the ECU after the opening of the blind, and the rear glass is opened when the second stage open signal is determined by the ECU after the opening of the front glass.

The method may further include closing the rear glass by moving forward the rear sled, which is selectively connected with the front sled by a front timing plate, when a first stage close signal is determined by the ECU in a state in which all of the blind, the front glass, and the rear glass are opened, closing the front glass by releasing the connection between the front sled and the rear sled by the front timing plate and moving the front sled forward, when the first stage close signal is determined by the ECU again in a state in which the rear glass is closed, and closing the blind disposed below the front glass and the rear glass when the first stage close signal is determined by the ECU again in a state in which the rear glass and the front glass are closed, in which all of the blind, the front glass, and the rear glass are closed when a second stage close signal is determined by the ECU prior to the closing of the rear glass, the blind and the front glass are closed when the second stage close signal is determined by the ECU after the closing of the rear glass, and the blind is closed when the second stage close signal is determined by the ECU after the closing of the front glass.

The method may further include opening the blind to a position of a rear end of the front glass and tilting up a rear portion of the front glass by rotating a front tilt lever disposed rearward of the front glass, when a tilt signal is determined by the ECU in a state in which all of the front glass, the rear glass, and the blind are closed, closing the front glass by moving the front sled forward, when the first stage close signal is determined by the ECU in a state in which the blind is opened to the position of the rear end of the front glass and the rear portion of the front glass is tilted up, and closing the blind when the first stage close signal is determined by the ECU again in a state in which the front glass is closed, in which both of the front glass and the blind are closed when the second stage close signal is determined by the ECU prior to the closing of the front glass, and the blind is closed when the second stage close signal is determined by the ECU after the closing of the front glass.

According to the present invention having the aforementioned configurations, both of the front glass and the rear glass may be opened, thereby improving ventilation performance of the panoramic sunroof and open feeling for occupants.

According to the present invention, the front glass is configured to be moved after being tilted up by the front lever and the front tilt lever, and the rear glass is configured to be moved after tilted up by the rear lever and the rear tilt lever, thereby increasing a space of a head room in the vehicle.

That is, unlike the dual-opening panoramic sunroof in the related art in which the front glass slides to the outside of the roof panel and the rear glass slides to the inside of the roof panel, in the case of the present invention, both of the front glass and the rear glass slide to the outside of the roof panel, and as a result, the space of the head room is not affected by the front glass and the rear glass.

According to the present invention, the front sled, the rear sled, and the rear tilt lever are configured to be organically connected to each other by using the front timing plate and the rear timing plate, and as a result, the front glass and the rear glass may be operated by a single drive motor and the mechanism rails, thereby reducing production costs and weight of the vehicle.

According to the present invention, the front glass and the rear glass may be moved by using the front and rear timing plates having a relatively simple mechanical structure, and as a result, failure occurs less frequently, and maintenance, repair and replacement may be easily carried out.

According to the present invention, as production costs and weight of the vehicle are decreased, a space in the vehicle is increased, and open feeling for the occupants is improved, thereby easily manufacturing a high-grade vehicle and improving marketability of the vehicle.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
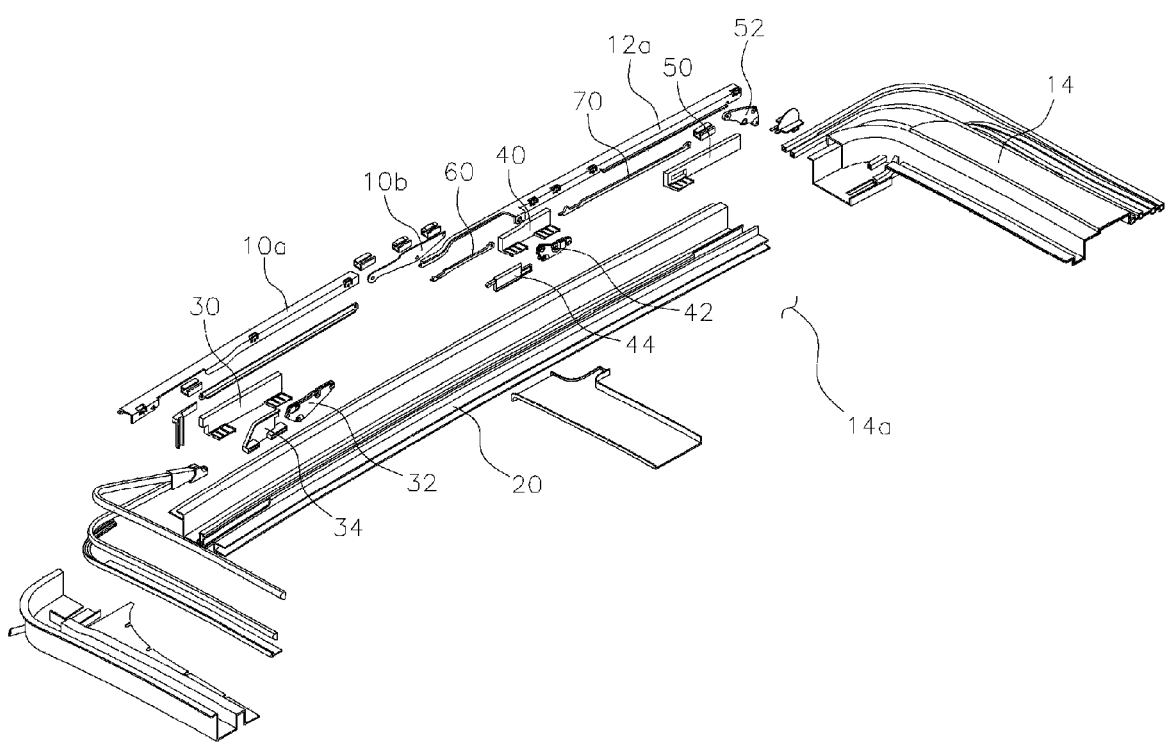
FIG. 1 is an exploded perspective view illustrating components of an exemplary dual-opening panoramic sunroof according to the present invention.

FIG. 1 is an exploded perspective view illustrating components of a dual-opening panoramic sunroof according to various embodiments of the present invention, and FIG. 2A to FIG. 2D are side views illustrating appearances of the dual-opening panoramic sunroof for each state.

As illustrated, mechanism rails 20 are installed at both sides of an opening 14a formed in a roof panel 14 of a vehicle, and a front sled 30 and a rear sled 40 are mounted to be slidable along the mechanism rails 20.

While the mechanism rail 20 installed at only one side of the opening 14a is illustrated in the illustrated embodiments, it can be seen that the mechanism rail 20 having the same shape is also installed at the other side of the opening 14a.

The front sled 30 and the rear sled 40 are connected to a front glass 10 and a rear glass 12, respectively, and allow the front glass and the rear glass to slide forward and rearward, and although not illustrated, the front sled 30 is connected to a drive motor (not illustrated) by means of a cable and moved forward and rearward.

Like a typical sunroof glass, the front glass 10 and the rear glass 12 are made of glass that effectively blocks ultraviolet rays and infrared rays, and may be formed of various types of glass such as transparent glass or opaque glass, or synthetic resin.

A rear tilt sled 50 is mounted rearward of the mechanism rail 20 so as to be slidable forward and rearward, and the rear tilt sled 50 accommodates a portion of a rear tilt lever 52 so as to allow the rear tilt lever to rotate.

When the rear sled 40 is moved rearward, the rear tilt sled 50 is moved rearward by being pushed by the rear sled, such that the rear tilt lever 52 is rotated and tilts up a rear portion of the rear glass 12.

The front sled 30 and the rear sled 40 are selectively connected by a front timing plate 60, and the rear sled 40 and the rear tilt sled 50 are connected by a rear timing plate 70, such that even though only the front sled 30 is moved forward and rearward, the front glass 10 and the rear glass 12 are organically opened.

Figure 2A:
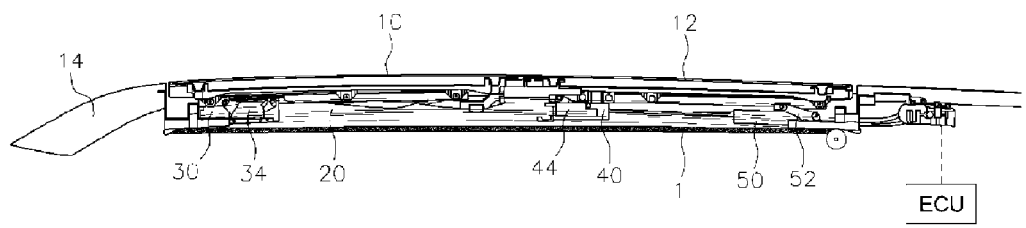
FIG. 2A is a side view illustrating the exemplary dual-opening panoramic sunroof according to the present invention in a state in which a front glass and a rear glass are closed.

As illustrated in FIG. 2A, when the front glass 10 and the rear glass 12 are placed in a closed state, the front sled 30 is disposed forward of the mechanism rail, and the rear sled 40 is disposed at a center of the mechanism rail.

Figure 2B:
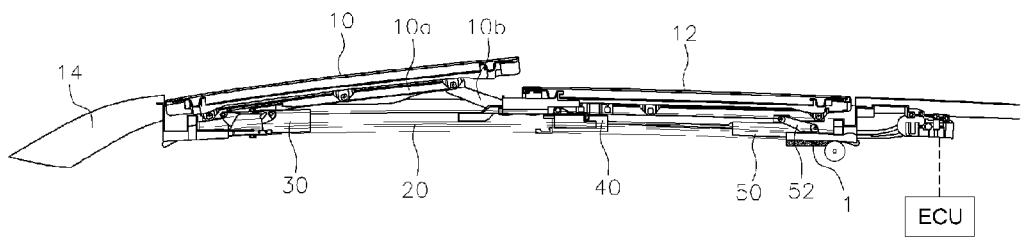
FIG. 2B is a side view illustrating the exemplary dual-opening panoramic sunroof according to the present invention in a state in which a rear portion of the front glass is tilted up.

As illustrated in FIG. 2B, when the front sled 30 is slightly moved rearward, a front tilt lever 10b, which is disposed rearward of the front glass 10, is rotated clockwise and tilts up a rear portion of the front glass 10.

Figure 2C:
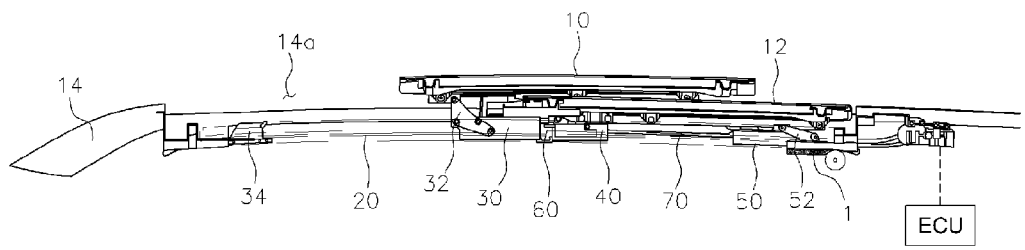
FIG. 2C is a side view illustrating the exemplary dual-opening panoramic sunroof according to the present invention in a state in which the front glass is opened.

As illustrated in FIG. 2C, when the front sled 30 is further moved rearward, a front lever 32, which connects a front carriage plate 10a coupled to a lower portion of the front glass 10 and the front sled 30, is rotated clockwise and tilts up a front portion of the front glass 10, and at the same time, the front glass 10 is opened while being moved rearward.

Figure 2D:
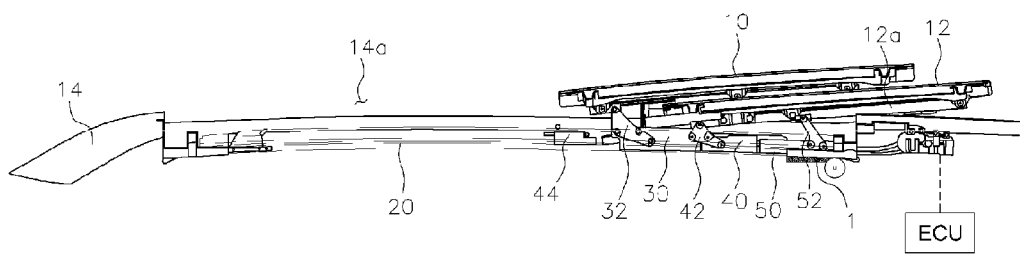
FIG. 2D is a side view illustrating the exemplary dual-opening panoramic sunroof according to the present invention in a state in which the front glass and the rear glass are opened.

As illustrated in FIG. 2D, when the front sled 30 is further moved rearward in a state in which the front sled 30 and the rear sled 40 are connected by the front timing plate 60, the rear tilt sled 50, which is connected with the rear sled by the rear timing plate 70, is moved rearward while the rear sled 40 is moved rearward, such that the rear tilt lever 52 is rotated clockwise and tilts up the rear portion of the rear glass 12.

A rear lever 42, which connects a rear rail 12a coupled to a lower portion of the rear glass 12 and the rear sled 40, is rotated clockwise and tilts up a front portion of the rear glass 12, and at the same time, the rear glass is opened while being moved rearward.

The front glass 10 and the rear glass 12 are closed through a process opposite to the aforementioned process, that is, the rear glass is closed while being moved forward and then the front glass is closed while being moved forward.

Specific configurations and operations of the front timing plate 60, which selectively connects the front sled and the rear sled, and the rear timing plate 70, which connects the rear sled and the rear tilt sled, will be described in detail below.

Figure 3A:
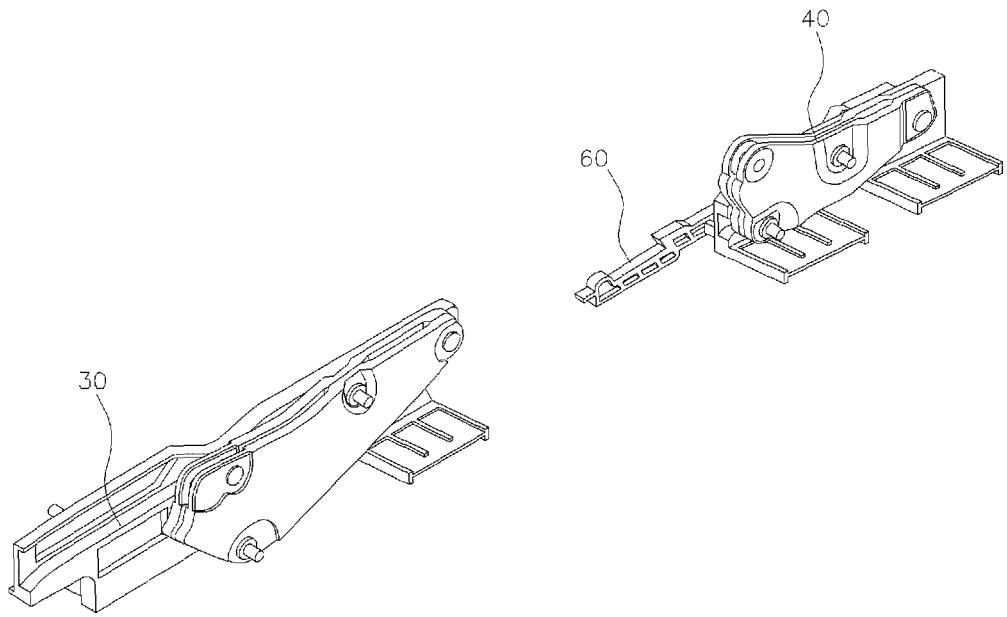
FIG. 3A and FIG. 3B are a perspective view and a cross-sectional view illustrating an appearance of a front timing plate when a front sled and a rear sled according to the present invention are spaced apart from each other, when viewed from the inside of a vehicle.
Figure 3B:
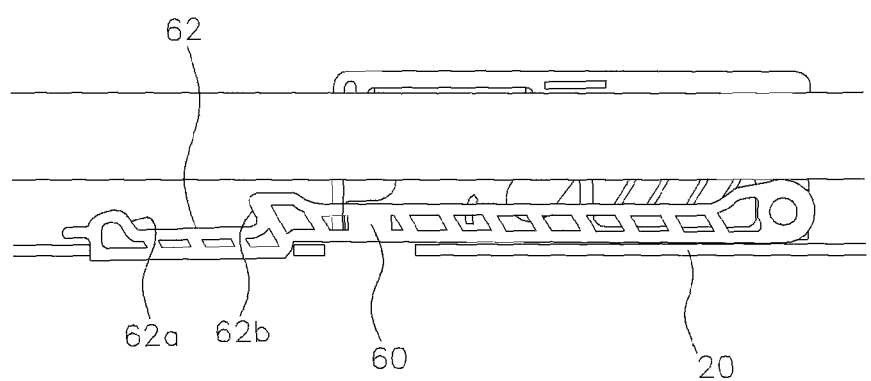
Figure 4A:
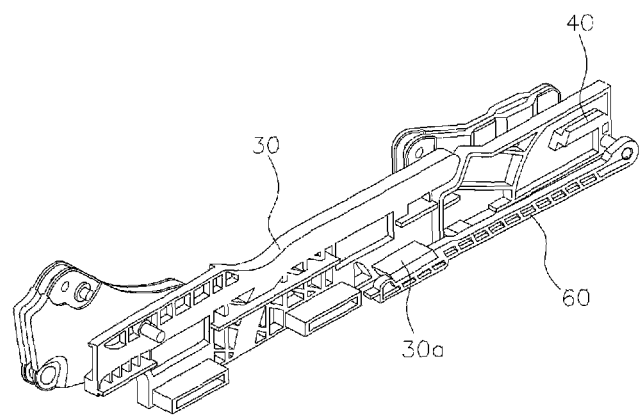
FIG. 4A and FIG. 4B are a perspective view and a cross-sectional view illustrating an appearance of the front timing plate when the front sled and the rear sled according to the present invention come into contact with each other, when viewed from the outside of the vehicle.
Figure 4B:
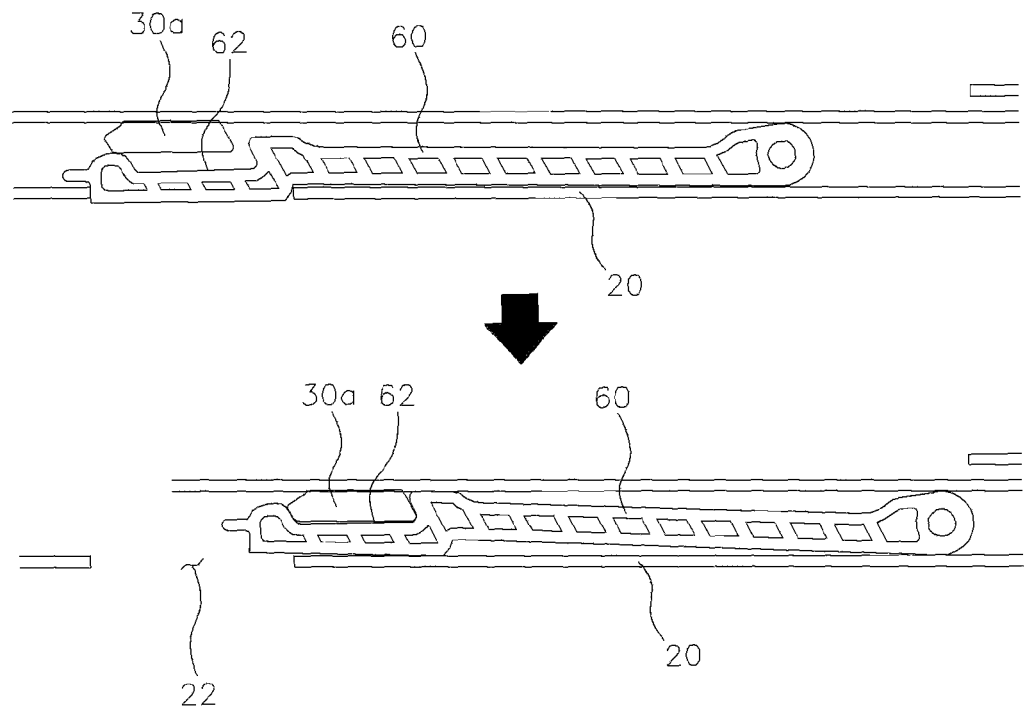

FIG. 3A is a perspective view illustrating an appearance when the front sled and the rear sled according to various embodiments of the present invention are spaced apart from each other, when viewed from the inside of a vehicle, FIG. 3B is a cross-sectional view illustrating an appearance of the front timing plate according to various embodiments of the present invention, FIG. 4A is a perspective view illustrating an appearance when the front sled and the rear sled according to various embodiments of the present invention are in contact with each other, when viewed from the outside of the vehicle, and FIG. 4B is a cross-sectional view illustrating an appearance of the front timing plate when the front sled comes into contact with the rear sled according to various embodiments of the present invention.

As illustrated, a rear end of the front timing plate 60 is rotatably coupled to the rear sled 40, and a front groove 62 is formed at a front end of the front timing plate 60 so that a portion of the front sled 30 may be accommodated in the front groove 62.

As illustrated in FIG. 3A and FIG. 3B, when the front sled 30 and the rear sled 40 are spaced apart from each other, that is, when the front glass 10 and the rear glass 12 are closed, the front sled 30 and the rear sled 40 are disconnected from each other, and the rear sled 40 is maintained in a fixed state.

Specifically, a rail trimmed portion 22 is penetratively formed in a lower portion of the mechanism rail 20 so as to correspond to a position of the front timing plate 60, and a lower end of the front groove 62 of the front timing plate is restricted by being inserted into the rail trimmed portion 22.

As illustrated in FIG. 4A, a front protrusion 30a protrudes from one side of the front sled 30 so as to be accommodated in the front groove 62, the front protrusion 30a pushes the front timing plate 60 rearward in a state in which the front protrusion 30a is accommodated in the front groove 62, thereby releasing the rail trimmed portion 22.

As illustrated in FIG. 4B, a front surface of the front groove 62 is formed as a first front inclined surface 62a having an obtuse angle, a rear surface of the front groove 62 is formed as a second front inclined surface 62b having an acute angle, and front and rear surfaces of the front protrusion 30a are formed to have shapes corresponding to the shapes of the first front inclined surface 62a and the second front inclined surface 62b.

Therefore, when predetermined or larger force is applied to the front protrusion 30a, the front protrusion 30a may climb over the first front inclined surface 62a but may not climb over the second front inclined surface 62b (the front protrusion 30a is restricted by the first front inclined surface when predetermined or smaller force is applied thereto), such that the second front inclined surface 62b serves as a support surface that transmits force applied by the front sled to the rear sled 40.

When the front glass 10 and the rear glass 12 are opened, the front protrusion 30a is accommodated in the front groove 62, such that connection between the front sled 30 and the rear sled 40 is maintained, and the front sled 30 and the rear sled 40 are moved reward together.

When the front glass 10 and the rear glass 12 are being closed, the connection between the front sled 30 and the rear sled 40 is maintained when predetermined or smaller force is applied (before the rear glass is completely closed), but the connection between the front sled 30 and the rear sled 40 is released from each other when predetermined or larger force is applied (after the rear glass is completely closed).

Figure 5A:
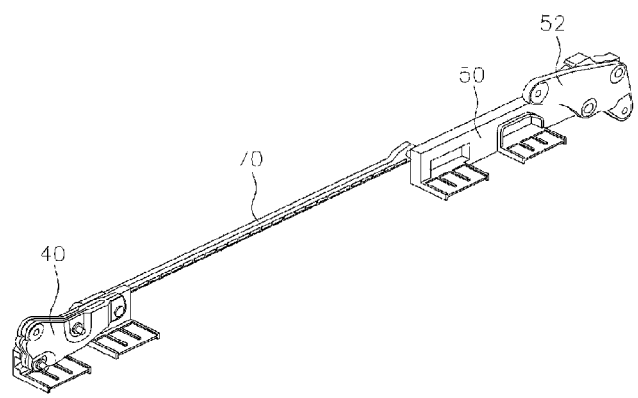
FIG. 5A and FIG. 5B are a perspective view and a cross-sectional view illustrating an appearance of a rear timing plate before the rear sled according to the present invention is moved rearward.
Figure 5B:
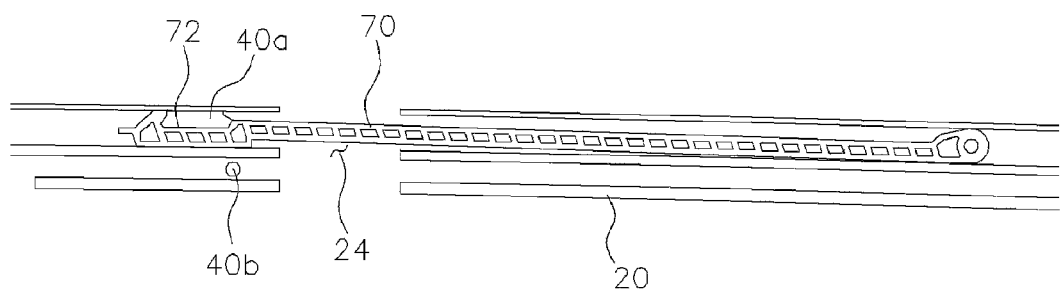
Figure 6A:
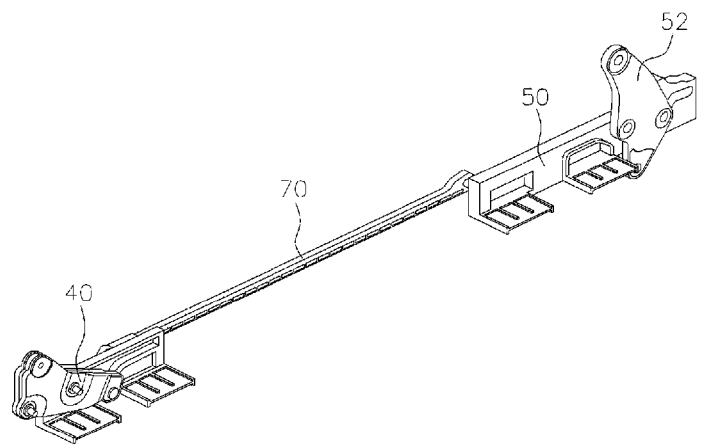
FIG. 6A and FIG. 6B are a perspective view and a cross-sectional view illustrating an appearance of the rear timing plate when the rear sled according to the present invention is moved rearward and a rear tilt lever is rotated.
Figure 6B:
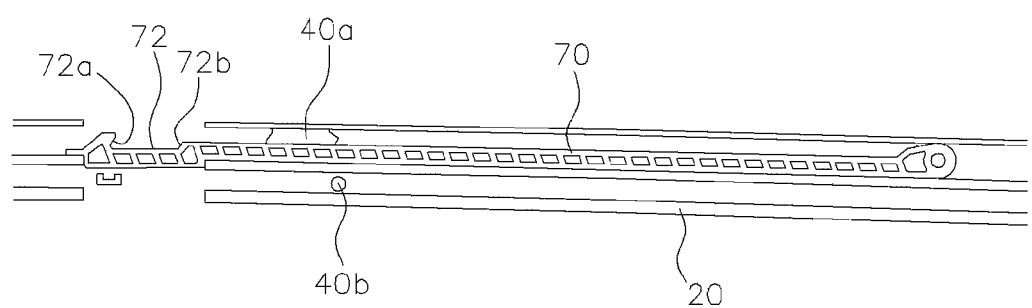
Figure 7A:
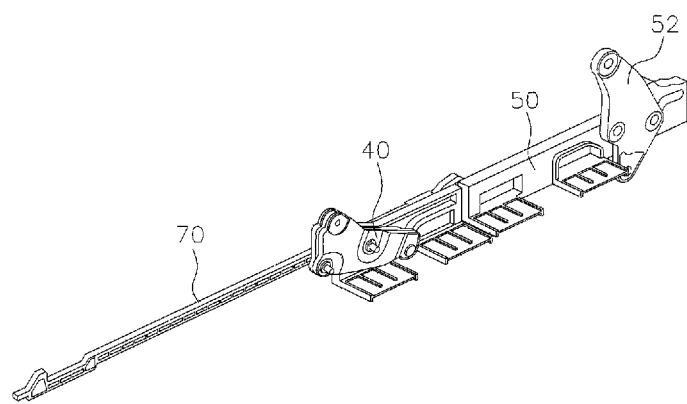
FIG. 7A and FIG. 7B are a perspective view and a cross-sectional view illustrating an appearance of the rear timing plate when the rear sled according to the present invention is moved rearward and the rear glass is opened.
Figure 7B:
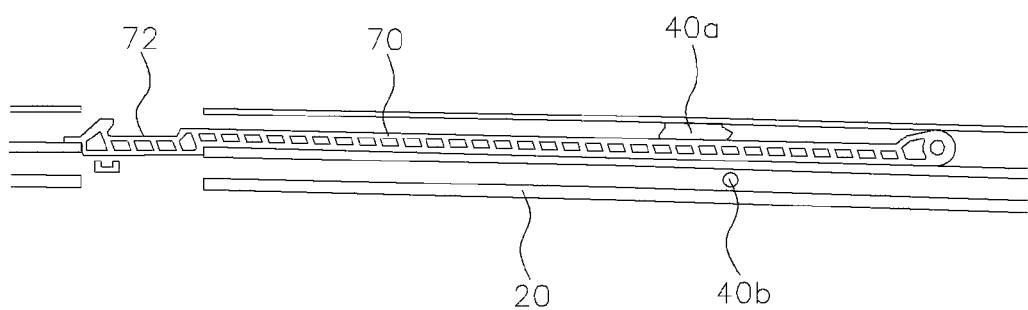

FIG. 5A and FIG. 5B are a perspective view and a cross-sectional view illustrating an appearance of the rear timing plate before the rear sled according to various embodiments of the present invention is moved rearward, FIG. 6A and FIG. 6B are a perspective view and a cross-sectional view illustrating an appearance of the rear timing plate when the rear sled according to various embodiments of the present invention is moved rearward and the rear tilt lever is rotated, and FIG. 7A and FIG. 7B is a perspective view and a cross-sectional view illustrating an appearance of the rear timing plate when the rear sled according to various embodiments of the present invention is moved rearward and the rear glass is opened.

As illustrated, a rear end of the rear timing plate 70 is rotatably coupled to the rear tilt sled 50, and a rear groove 72 is formed at a front end of the rear timing plate 70 so that a portion of the rear sled may be accommodated in the rear groove 72, thereby connecting the rear sled 40 and the rear tilt sled 50.

A first rear protrusion 40a protrudes from one side of the rear sled 40 so as to be accommodated in the rear groove 72, a second rear protrusion 40b is formed to be spaced apart from the first rear protrusion 40a so as to support the rear timing plate, a front surface of the rear groove 72 is formed as a first rear inclined surface 72a having an acute angle, a rear surface of the rear groove 72 is formed as a second rear inclined surface 72b having an obtuse angle, and front and rear surfaces of the first rear protrusion 40a are formed to have shapes corresponding to the shapes of the first rear inclined surface 72a and the second rear inclined surface 72b of the rear groove.

As illustrated in FIG. 5A and FIG. 5B, before the rear sled 40 is moved, that is, when the rear glass 12 is completely closed, the first rear protrusion 40a is accommodated in the rear groove 72, and the rear sled 40 and the rear tilt sled 50 are maintained at a predetermined interval.

As illustrated in FIG. 6A and FIG. 6B, when force is applied to the extent that the rear sled 40 is slightly moved rearward and the first rear protrusion 40a cannot climb over the second rear inclined surface 72b, the rear tilt sled 50, which is connected to the rear sled 40 by the rear timing plate 70, is slightly moved rearward together with the rear sled 40 so as to rotate the rear tilt lever 52 clockwise, such that the rear portion of the rear glass 12 is tilted up.

When the rear timing plate 70 is further moved slightly rearward, a lower end of the rear groove 72 of the rear timing plate is restricted by being inserted into a rail groove 24 that is penetratively formed in the mechanism rail 20, and in this case, the first rear protrusion 40*a* climbs over the second rear inclined surface 72*b*.

As illustrated in FIG. 7A and FIG. 7B, in a state in which the lower end of the rear groove 72 is inserted into the rail groove 24 and the rear timing plate 70 is restricted so as not to be moved leftward and rightward, the rear sled 40 is still further moved rearward, and the rear glass 12 is opened.

In this case, as illustrated in FIG. 7B, a distance at which the first rear protrusion 40*a* and the second rear protrusion 40*b* are spaced apart from each other is identical to a width of the rear timing plate 70, thereby preventing the rear timing plate 70 from being moved vertically when the rear sled 40 is moved.

Figure 8A:
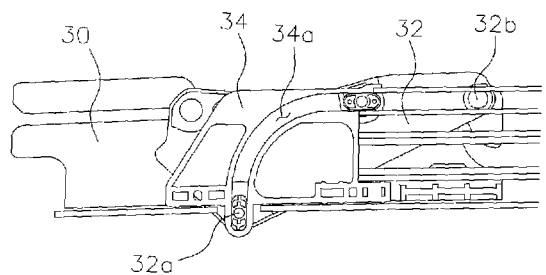
FIG. 8A, FIG. 8B, and FIG. 8C are side views illustrating a process in which a front lever according to the present invention is rotated.
Figure 8B:
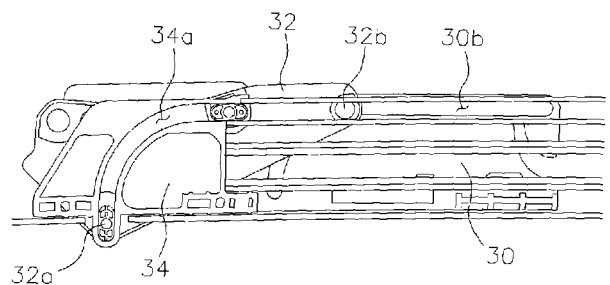
Figure 9A:
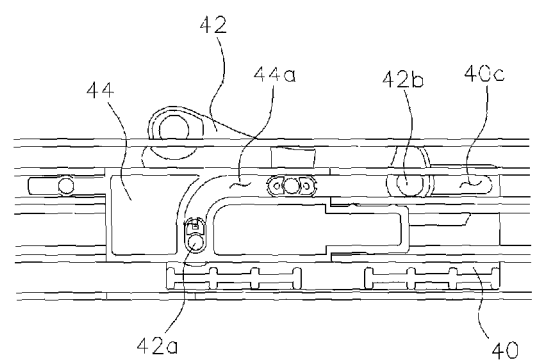
FIG. 9A and FIG. 9B are side views illustrating a process in which a rear lever according to the present invention is rotated.
Figure 9B:
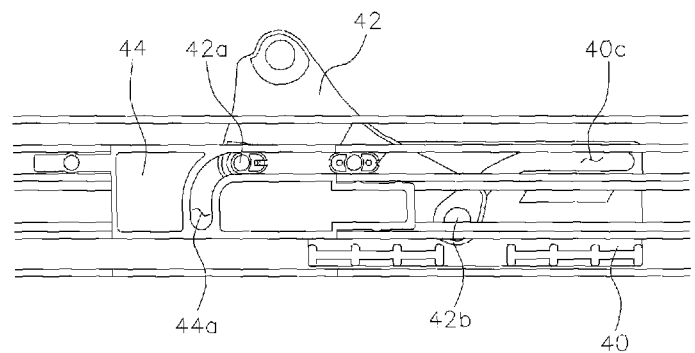

FIG. 8A and FIG. 8B are side views illustrating a process in which the front lever according to the present invention is rotated, FIG. 9A and FIG. 9B are side views illustrating a process in which the rear lever according to the present invention is rotated, and FIG. 10 is a side view illustrating a process in which the rear tilt lever according to various embodiments of the present invention is rotated.

As illustrated in FIG. 2D and the like, the front lever 32 is rotatably connected between the front carriage plate 10*a* coupled to the lower portion of the front glass 10 and the front sled 30 so as to tilt up the front portion of the front glass 10, and the rear lever 42 is rotatably connected between the rear rail 12*a* coupled to the lower portion of the rear glass 12 and the rear sled 40 so as to tilt up the front portion of the rear glass 12.

A front guide 34 is mounted on a front portion of the mechanism rail 20, a rear guide 44 is mounted at a central portion of the mechanism rail 20, and the front guide 34 and the rear guide 44 serve to guide the cable when the cable is moved in accordance with an operation of the drive motor.

As illustrated in FIG. 8, a first front protruding portion 32*a* and a second front protruding portion 32*b* protrude from a lateral surface of the front lever 32, the first front protruding portion 32*a* is slidably accommodated in a front guide slit 34*a* curvedly formed in the front guide 34, and the second front protruding portion 32*b* is slidably accommodated in a front slit 30*b* formed in the front sled 30.

Specifically, as illustrated in FIG. 8A, when the front glass 10 is closed, the first front protruding portion 32*a* is maintained to be disposed at a lower end of the front guide slit 34*a*, and the second front protruding portion 32*b* is maintained to be disposed at an upper end of the front slit 30*b*.

The front slit 30*b* has a shape in which a straight line portion and a curved line portion are connected in the form of an 'L' shape, and as illustrated in FIG. 8B, when the rear portion of the front glass 10 is tilted up, the front sled 30 is moved rearward (rightward in the illustrated embodiments), and the second front protruding portion 32*b* slides leftward along the straight line portion of the front slit 30*b*.

Figure 8C:
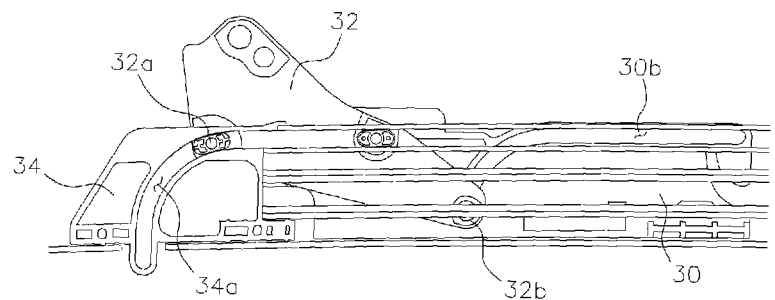

As illustrated in FIG. 8C, when the front glass 10 is being opened, the second front protruding portion 32*b* slides counterclockwise along the curved line portion of the front slit 30*b* while the front sled 30 is still further moved rearward, the first front protruding portion 32*a* slides clockwise along the front guide slit 34*a*, and the front lever 32 is rotated clockwise and tilts up the front portion of the front glass 10.

As illustrated in FIG. 9A and FIG. 9B, a first rear protruding portion 42*a* and a second rear protruding portion 42*b* protrude from a lateral surface of the rear lever 42, the first rear protruding portion 42*a* is slidably accommodated in a rear guide slit 44*a* curvedly formed in the rear guide 44, and the second rear protruding portion 42*b* is slidably accommodated in a rear slit 40*c* curvedly formed in the rear sled.

Specifically, as illustrated in FIG. 9A, when the rear glass 12 is closed, the first rear protruding portion 42*a* is maintained to be disposed at a lower end of the rear guide slit 44*a*, and the second rear protruding portion 42*b* is maintained to be disposed at an upper end of the rear slit 40*c*.

As illustrated in FIG. 9B, when the rear glass 12 is being opened, the second rear protruding portion 42*b* slides counterclockwise along the rear slit 40*c* while the rear sled 40 is moved rearward, the first rear protruding portion 42*a* slides clockwise along the rear guide slit 44*a*, and the rear lever 42 is rotated clockwise and tilts up the front portion of the rear glass 12.

Figure 10A:
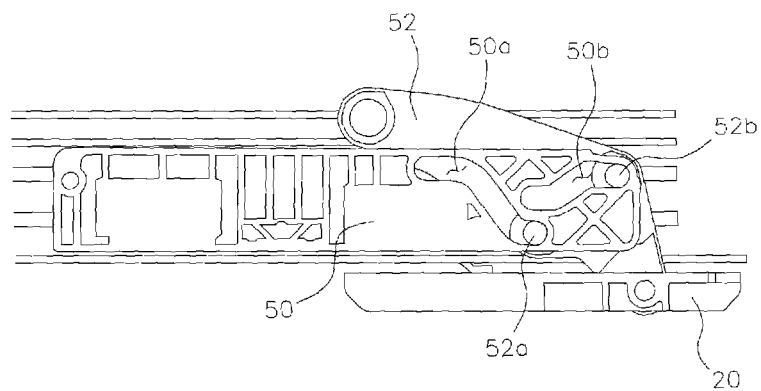
FIG. 10A and FIG. 10B are side views illustrating a process in which a rear tilt lever according to the present invention is rotated.
Figure 10B:
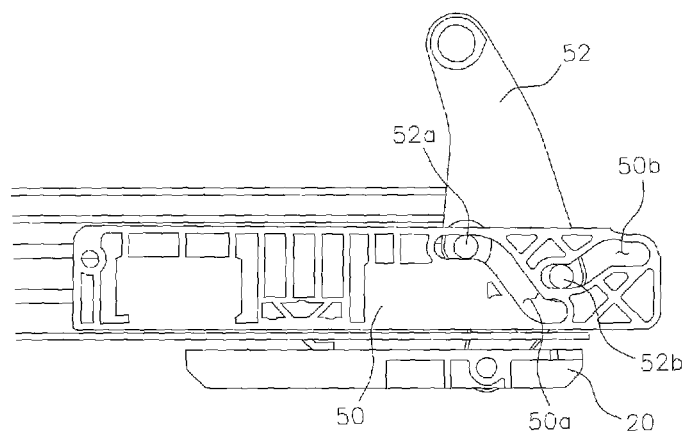

As illustrated in FIG. 10A and FIG. 10B, the rear tilt sled 50 and the rear tilt lever 52 are mounted at a rear portion of the mechanism rail 20, a first rear tilt slit 50*a* and a second rear tilt slit 50*b* are curvedly and penetratively formed in the rear tilt sled 50, and a first rear tilt protruding portion 52*a* and a second rear tilt protruding portion 52*b* protrude from the rear tilt lever 52.

The first rear tilt protruding portion 52*a* and the second rear tilt protruding portion 52*b* are slidably accommodated in the first rear tilt slit 50*a* and the second rear tilt slit 50*b*, respectively, and a lower end of the rear tilt lever 52 is rotatably coupled to the mechanism rail 20.

Specifically, as illustrated in FIG. 10A, when the rear glass 12 is closed, the first rear tilt protruding portion 52*a* is maintained to be disposed at a right lower end of the first rear tilt slit 50*a*, and the second rear tilt protruding portion 52*b* is maintained to be disposed at a right upper end of the second rear tilt slit 50*b*.

As illustrated in FIG. 10B, when the rear glass 12 is being opened, the first rear tilt protruding portion 52*a* and the second rear tilt protruding portion 52*b* slide counterclockwise along the first rear tilt slit 50*a* and the second rear tilt slit 50*b*, respectively, while the rear tilt sled 50 is moved rearward, and the rear tilt lever 52 is rotated clockwise and tilts up the rear portion of the rear glass 12.

Hereinafter, a method of operating the dual-opening panoramic sunroof according to various embodiments of the present invention will be described.

Figure 11:
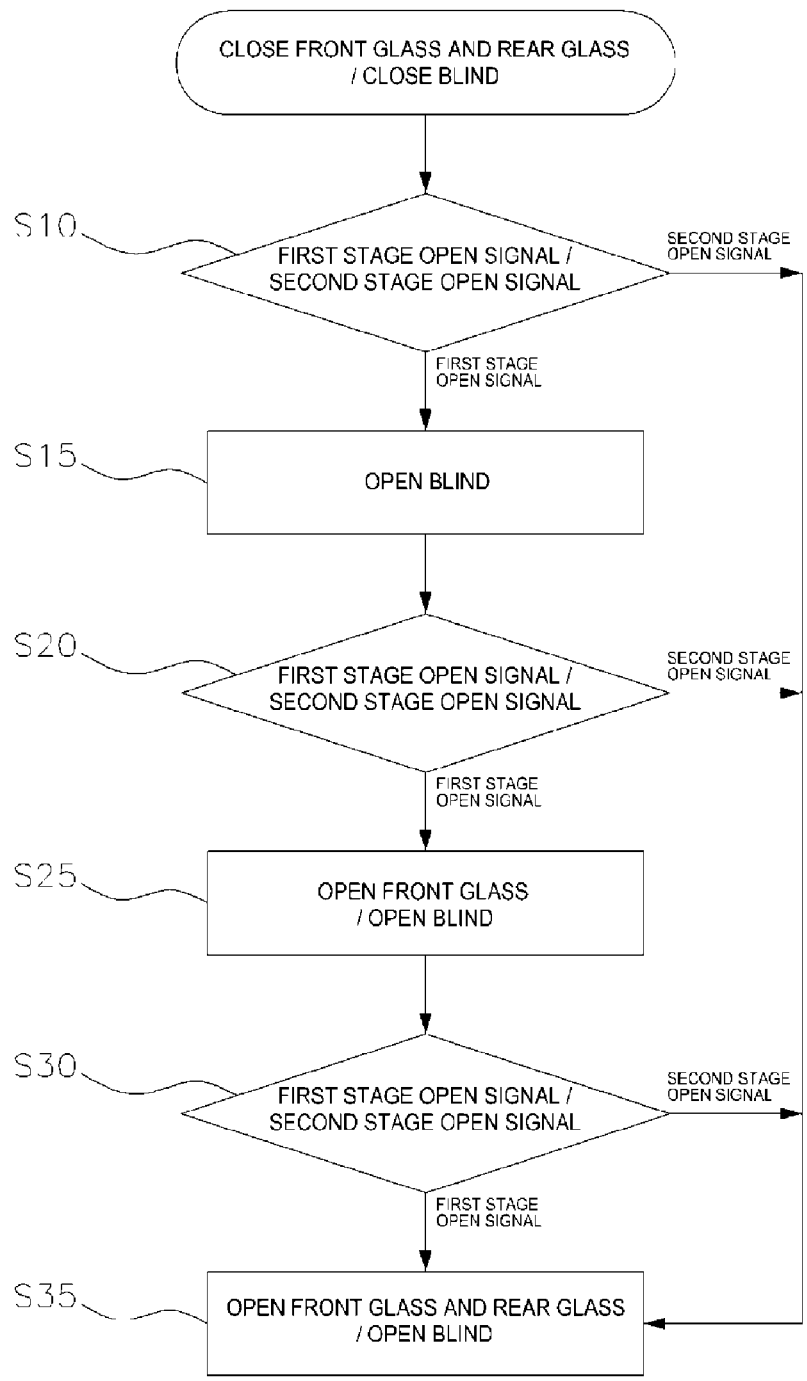
FIG. 11 is a flowchart illustrating a process in which the front glass and the rear glass according to the present invention are opened.
Figure 12:
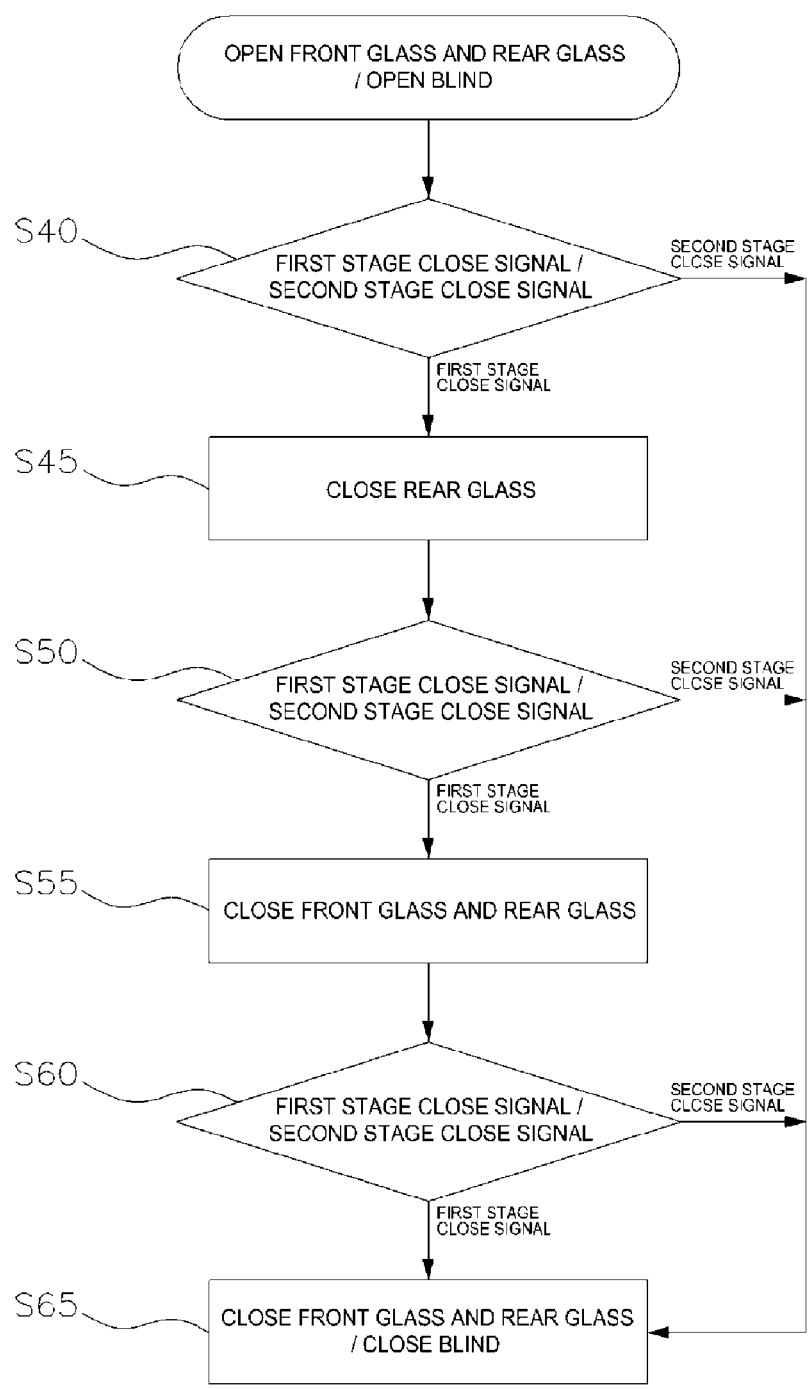
FIG. 12 is a flowchart illustrating a process in which the front glass and the rear glass according to the present invention are closed.
Figure 13:
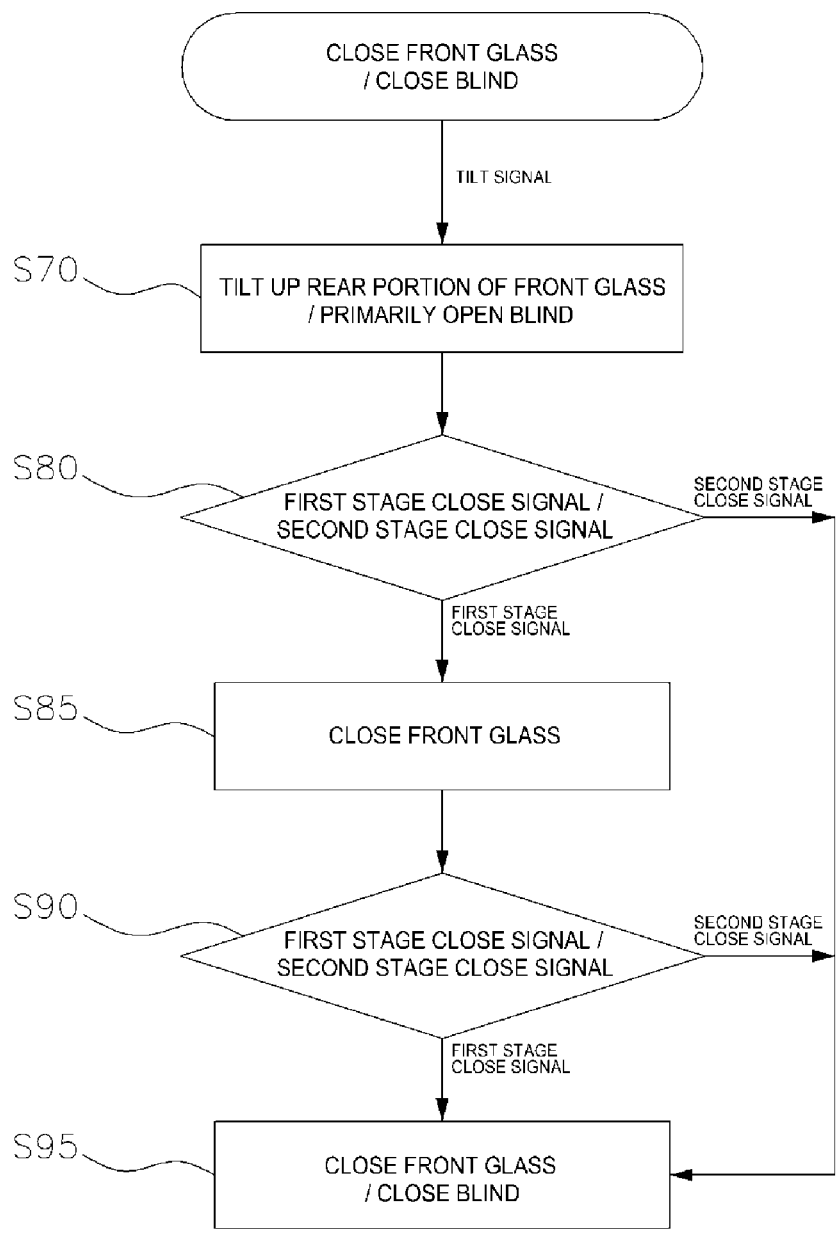
FIG. 13 is a flowchart illustrating a process in which the front glass according to the present invention is tilted up and then closed again.

FIG. 11 is a flowchart illustrating a process in which the front glass and the rear glass according to various embodiments of the present invention are opened, FIG. 12 is a flowchart illustrating a process in which the front glass and the rear glass according to various embodiments of the present invention are closed, and FIG. 13 is a flowchart illustrating a process in which the front glass according to various embodiments of the present invention is tilted up and then closed again.

As illustrated in FIG. 11, when a driver inputs an open signal in a state in which the front glass 10, the rear glass 12, and a blind 1 disposed below the front glass and the rear glass are all closed, the front glass 10, the rear glass 12, and the blind are opened in a stepwise manner.

The open signal is recognized and controlled by an electronic control unit (ECU) of the vehicle, and the blind is operated by a motor like a publicly known blind.

First, when the driver provides an open signal by manipulating a button mounted in the vehicle, the ECU of the vehicle determines whether the open signal is a first stage open signal or a second stage open signal (S10).

When the open signal is the first stage open signal, the front glass and the rear glass are maintained in initial closed states, and only the blind is opened while being moved rearward (S15).

When the driver inputs an open signal again, the ECU of the vehicle determines whether the open signal is the first stage open signal or the second stage open signal (S20), and when the open signal is the first stage open signal, the front glass is also opened while being moved rearward (S25).

When the driver inputs an open signal once more, the ECU of the vehicle determines whether the open signal is the first stage open signal or the second stage open signal (S30), and when the open signal is the first stage open signal, the rear glass is also opened while being moved rearward, such that all of the front glass, the rear glass, and the blind are placed in the opened state (S35).

If the second stage open signal is recognized when determining the open signal prior to the opening of the blind (S10), all of the blind, the front glass, and the rear glass are opened at one time instead of being opened in a stepwise manner (S35).

In addition, if the second stage open signal is recognized when determining the open signal after the opening of the blind (S20), both of the front glass and the rear glass are opened at one time instead of being opened in a stepwise manner (S35).

If the second stage open signal is recognized when determining the open signal after the opening of the front glass (S30), the rear glass is opened (S35).

As illustrated in FIG. 12, when the driver inputs a close signal in a state in which all of the front glass 10, the rear glass 12, and the blind are opened, the front glass 10, the rear glass 12, and the blind are closed in a stepwise manner.

First, when the driver inputs a close signal, the ECU of the vehicle determines whether the close signal is a first stage close signal or a second stage close signal (S40), and when the close signal is the first stage close signal, the front glass and the blind are maintained in initial opened states, and only the rear glass is closed while being moved forward (S45).

When the driver inputs a close signal again, the ECU of the vehicle determines whether the close signal is the first stage close signal or the second stage close signal (S50), and when the close signal is the first stage close signal, the front glass is also closed while being moved forward (S55).

When the driver inputs a close signal once more, the ECU of the vehicle determines whether the close signal is the first stage close signal or the second stage close signal (S60), and when the close signal is the first stage close signal, the blind is also closed while being moved forward, and finally, all of the front glass, the rear glass, and the blind are placed in the closed state (S65).

If the second stage close signal is recognized when determining the close signal prior to the closing of the rear glass (S40), all of the blind, the front glass, and the rear glass are closed at one time instead of being closed in a stepwise manner (S65).

If the second stage close signal is recognized when determining the close signal after the closing of the rear glass (S50), both of the front glass and the blind are closed at one time (S65), and if the second stage close signal is recognized after the closing of the front glass (S60), the blind is closed (S65).

As illustrated in FIG. 13, when a tilt signal is recognized in a state in which the front glass 10 and the blind are closed, the blind is opened (hereinafter, referred to as 'primarily opened') to a position of the rear end of the front glass, and the rear portion of the front glass 10 is tilted up by the rotation of the front tilt lever 10b disposed rearward of the front glass 10 (S70).

The primarily opened state of the blind means a state in which the blind is opened only to a position of the front glass but is not opened to a position of the rear glass, that is, a state in which the blind is opened to a middle position of the roof panel, and the front tilt lever 10b is illustrated in FIG. 2B and the like.

When the driver inputs a close signal in a state in which the front glass is tilted up and the blind is primarily opened, the ECU of the vehicle determines whether the close signal is the first stage close signal or the second stage close signal (S80), and when the close signal is the first stage close signal, the front glass is tilted down and then closed (S85).

When the driver inputs a close signal again, whether the close signal is the first stage close signal or the second stage close signal is determined (S90), and when the close signal is the first stage close signal, the blind is also closed while being moved forward (S95).

If the second stage close signal is recognized prior to the closing of the front glass (S80), both of the front glass and the blind are closed at one time, and if the second stage close signal is recognized after the closing of the front glass (S90), the blind is closed while being moved forward (S95).

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A dual-opening panoramic sunroof comprising:
   a front glass sliding forward and rearward by being connected with a front sled that is slidable forward and rearward along a mechanism rail disposed at either side of an opening formed in a roof panel of a vehicle;
   a rear glass sliding forward and rearward by being connected with a rear sled that is slidable forward and rearward along the mechanism rail;
   a front timing plate which has a rear end rotatably coupled to the rear sled, and a front end formed with a front groove to accommodate a portion of the front sled, and selectively connects the front sled and the rear sled;
   a rear tilt lever which is disposed rearward of the mechanism rail, is rotatable by having a portion that is accommodated in a rear tilt sled that is slidable forward and rearward, and tilts up a rear portion of the rear glass;
   a rear timing plate which has a rear end rotatably coupled to the rear tilt sled, and a front end formed with a rear groove formed to selectively accommodate a portion of the rear sled, and connects the rear sled and the rear tilt sled; and a rear lever rotatable connected between a rear rail coupled to a lower portion of the rear glass and the rear sled, wherein the rear lever is movable with the rear sled along the mechanism rail and is configured to tilt up a front portion of the rear glass, wherein both of the front glass and the rear glass are configured to slide after being tilted up toward an outside of the roof panel.

2. The dual-opening panoramic sunroof of claim 1, wherein a front protrusion protrudes from one side of the front sled to be accommodated in the front groove, a front surface of the front groove is formed as a first front inclined surface having an obtuse angle, a rear surface of the front groove is formed as a second front inclined surface having an acute angle, and front and rear surfaces of the front protrusion are formed to have shapes corresponding to shapes of the first front inclined surface and the second front inclined surface of the front groove.

3. The dual-opening panoramic sunroof of claim 1, wherein a rail trimmed portion is penetratively formed in a lower portion of the mechanism rail to restrict a lower end of the front groove of the front timing plate when the rear glass is closed.

4. The dual-opening panoramic sunroof of claim 1, wherein a first rear protrusion protrudes from one side of the rear sled so as to be accommodated in the rear groove, a second rear protrusion is formed to be spaced apart from the first rear protrusion so as to support the rear timing plate, a front surface of the rear groove is formed as a first rear inclined surface having an acute angle, a rear surface of the rear groove is formed as a second rear inclined surface having an obtuse angle, and front and rear surfaces of the first rear protrusion are formed to have shapes corresponding to shapes of the first rear inclined surface and the second rear inclined surface of the rear groove.

5. The dual-opening panoramic sunroof of claim 4, wherein a distance at which the first rear protrusion and the second rear protrusion are spaced apart from each other is identical to a width of the rear timing plate such that the rear timing plate is prevented from being moved vertically when the rear sled is moved.

6. The dual-opening panoramic sunroof of claim 1, wherein a first rear tilt slit and a second rear tilt slit are curvedly and penetratively formed in the rear tilt sled, a first rear tilt protruding portion and a second rear tilt protruding portion, which are slidably accommodated in the first rear tilt slit and the second rear tilt slit, respectively, are formed on the rear tilt lever, and when the rear tilt sled is moved rearward, the first rear tilt protruding portion and the second rear tilt protruding portion are configured to slide along the first rear tilt slit and the second rear tilt slit, respectively, such that the rear tilt lever is rotated.

7. The dual-opening panoramic sunroof of claim 1, further comprising:

a front lever which is rotatably connected between a front carriage plate coupled to a lower portion of the front glass and the front sled, and tilts up a front portion of the front glass.

* * * * *